July 4, 1939.  D. A. BOYD  2,164,380

SEAL

Filed Feb. 11, 1938

INVENTOR
DONALD A. BOYD.
BY
ATTORNEY

Patented July 4, 1939

2,164,380

UNITED STATES PATENT OFFICE 2,164,380

SEAL

Donald A. Boyd, Detroit, Mich.

Application February 11, 1938, Serial No. 189,944

2 Claims. (Cl. 288—1)

This invention relates to a seal and more particularly to a sealing or packing member which may be inserted as a unit in a housing surrounding a centrally located shaft.

An object of the invention is to provide a seal having a yieldable material which may be molded to a predetermined shape and having a reinforcing member moulded therein.

Another object of the invention is to provide a seal having a yieldable material which may be molded and bonded or vulcanized to a backing plate.

Other objects and advantages of the invention will be more apparent from the following description taken in connection with the accompanying drawing, in which.

Figure 1:
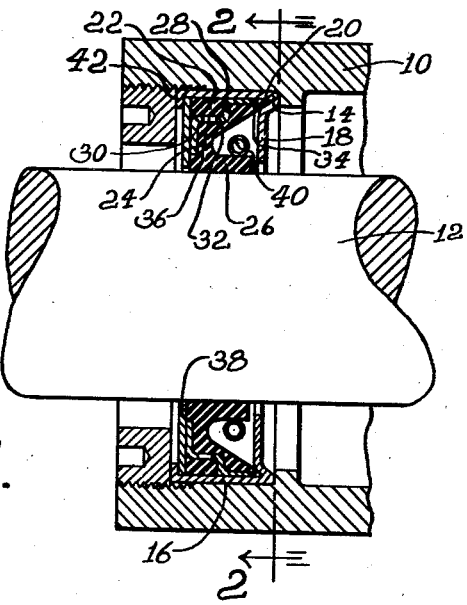
Fig. 1 is a longitudinal sectional view through a housing illustrating the improved seal in section surrounding a centrally located shaft.
Figure 2:
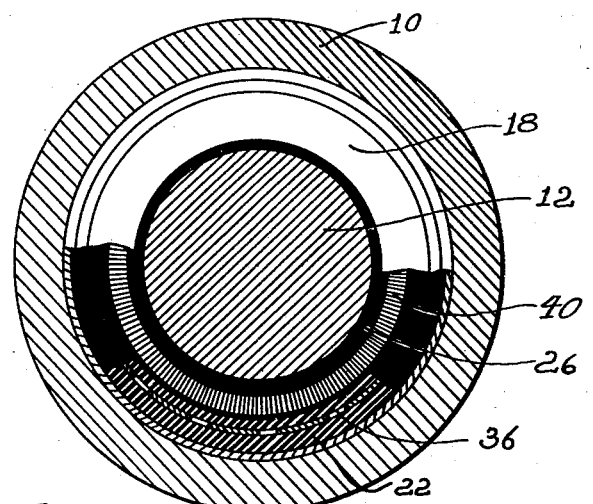
Fig. 2 is a sectional view taken on the line 2—2 of Fig. 1 showing an end portion of the seal, a portion thereof being broken away and in section.

Referring to the drawing, the seal is adapted to be inserted in a housing 10 in encompassing relation to a centrally located shaft 12. The seal consists of a housing 14 provided with an axially extending flange 16 and an integral radial flange 18 at one end thereof. The flange 18 is pressed axially inwardly to provide a V-shaped groove 20 adjacent the juncture of the flanges 16 and 18.

Yieldable material formed of rubber or other suitable composition material, has a substantially triangular body portion 22 in cross section, a radially extending neck portion 24 and an axially extending flange portion 26. The yieldable material is preferably molded.

The triangularly shaped body portion 22 has embedded therein an angularly shaped reinforcing member 28 having a radially extending flange 30 integrally connecting with two axially extending flanges 32 and 34, the flange 34 having a larger diameter than the flange 32. The latter flange is provided with a plurality of openings 36 through which the yieldable material extends to connect the outer portion of the material with the inner portion thereof.

In the form shown, the flanges 34 and 30 are formed in the plane of the axially and radially extending sides respectively of the packing member. The yieldable material, adjacent the side of the radially extending flange 30, is vulcanized or otherwise suitably secured to a radially extending washer 38. If desired, the vulcanization may be dispensed with and the washer 38 inserted in the housing as a separate member.

A coil spring 40 is positioned around the outer periphery of the flange 26 for urging the latter radially inwardly for sealing engagement with the shaft 12.

When the parts are assembled the yieldable material is forced into the V-shaped groove 20 and the outer free edge 42 of the housing 14 is bent over the outer periphery of the washer 38 to retain the parts in position.

Various changes, including the size, shape and arrangement of parts, may be made without departing from the spirit of the invention and it is not my intention to limit the scope thereof other than by the terms of the appended claims.

What I claim is:

1. A self-contained seal for insertion as an assembled unit in a housing surrounding a shaft comprising an annular housing having a peripheral flange, spaced radially extending flanges at the edges of said peripheral flange, one of said radially extending flanges being integral with said peripheral flange and the other being positioned by a radially extending edge portion of said peripheral flange, an annular yieldable member between said flanges having a body portion of substantially triangular shape in cross-section and an integral axially extending portion for sealing engagement with the shaft, and an annular reinforcing member angular in cross section embedded in said triangular body portion, said reinforcing member having a radially extending wall and a peripheral wall of different diameters, said radially extending wall being in contact with one of said radially extending flanges and the free edge of said peripheral wall being in contact with the other of said radially extending flanges.

2. A self-contained seal for insertion as an assembled unit in a housing surrounding a shaft comprising an annular housing having a peripheral flange, spaced radially extending flanges at the edges of said peripheral flange, one of said radially extending flanges being integral with said peripheral flange and the other being positioned by a radially extending edge portion of said peripheral flange, an annular yieldable member between said flanges having a body portion of substantially triangular shape in cross-section and an integral axially extending portion for sealing engagement with said shaft, an annular reinforcing member angular in cross section embedded in said triangular body portion and having a radially extending wall and a peripheral wall of different diameters, the radially extending wall of said reinforcing member being in contact with one of said radially extending flanges of said housing and the peripheral wall of larger diameter of said reinforcing member being in contact with the peripheral flange of said housing.

DONALD A. BOYD.